United States Patent [19]
Bardsley

[11] 3,979,198
[45] Sept. 7, 1976

[54] POLYURETHANE PLANT GROWTH MEDIUM

[75] Inventor: Charles E. Bardsley, Pascagoula, Miss.

[73] Assignee: Agritec, Co., Houston, Tex.

[22] Filed: Sept. 27, 1974

[21] Appl. No.: 509,980

Related U.S. Application Data

[63] Continuation of Ser. No. 410,881, Oct. 29, 1973, abandoned.

[52] U.S. Cl. ............................. 71/1; 71/29; 71/34; 71/50; 71/53; 71/63; 71/64 B; 71/DIG. 1
[51] Int. Cl.² ............................. A01N 7/00
[58] Field of Search ............ 71/29, 64 G, DIG. 1, 71/79, 1, 34, 50, 53, 63, 64 B

[56] References Cited
UNITED STATES PATENTS

| | | | |
|---|---|---|---|
| 2,927,851 | 3/1960 | Wilson | 71/62 |
| 3,231,363 | 1/1966 | Renner | 71/29 |
| 3,232,739 | 2/1966 | Belak | 71/28 |
| 3,245,776 | 4/1966 | Rubin | 71/1 |
| 3,333,940 | 8/1967 | Ridgeway | 71/29 |
| 3,373,009 | 3/1968 | Pruit et al. | 71/28 |
| 3,441,400 | 4/1969 | Otrhalek | 71/54 |
| 3,692,512 | 9/1972 | Sachnik | 71/65 |
| 3,725,528 | 4/1973 | Banin | 423/112 |
| 3,799,755 | 3/1974 | Rock | 71/24 |
| 3,838,075 | 9/1974 | Dietrich | 71/79 X |

*Primary Examiner*—Joseph Paul Brust
*Attorney, Agent, or Firm*—Fulbright & Jaworski

[57] ABSTRACT

A plant growth medium is disclosed having a polyurethane matrix with at least 40% and preferably 50 to 55% open cells, and from about 36% to about 50% (and more for example 60%) by weight of a granular filler dispersed throughout the polyurethane matrix, which filler comprises about 69% to about 78% by weight of clay of relatively high cation-exchange capacity, such as a calcium-hydrogen montmorillonite clay, and from about 22% to about 31% by weight plant nutrients and their carriers. The medium is self-contained and suitable for mechanized and automated plant propagation, growth, and outplanting; it has unique nutrient retention and release mechanisms co-acting with the polyurethane matrix, including integrated anion retention sites which, together with the cation retention sites of the clay and at least part encapsulation of the nutrients by the matrix cell membranes, result in a plant propagation and plant growth medium having properties and characteristics similar to and beyond those occurring in natural soils and which are especially valuable for performance. The growth medium may be used as a self-contained soil in various physical shapes and it may be ground and used by itself or in potting mixes. A number of examples is set forth.

4 Claims, No Drawings

POLYURETHANE PLANT GROWTH MEDIUM

REFERENCE TO RELATED APPLICATION

This application is a continuation in part of U.S. application Ser. No. 410,881 filed Oct. 29, 1973, now abandoned.

BACKGROUND OF THE INVENTION

The basic factors in retaining nutrients in forms available for use by plants common in natural soils include: (1) organic compounds subject to enzymatic breakdown which release plant nutrients, generally in ionic form; (2) ion exchange sites on colloids of alumino-silicates and, to some extent, on phenolic and carboxylic sites of organic colloids; (3) inorganic salts with some degree of solubility based on particle size, pH, concentrations, complementary ions, and other facets of the microenvironment; and (4) the soil solution, which bathes the soil solids and plant roots allowing cations and anions to freely exchange from one to the other.

The polyurethane plant growth medium of the present invention employs all four of the preceding principles and factors common in natural soils together with unique mechanisms that allow anion retention through the inductive effect of tertiary amine groups in the foam matrix (Factor 5), and the intimate relation of the essential plant nutrients with the polyurethane cells films which, in part, envelop the nutrient filler particles thus creating a semi-permeable membrane which responds to osmotic pressures due to ionic-molecular concentration gradients in the external solution thus providing an additional means for meeting plant nutrient requirements and fortifying the influence of the five previously-enumerated factors (Factor 6).

Other efforts have been made in the past to provide a suitable matrix or "container" for mechanized or automated propagation and growth of seedlings and cuttings, particularly in large scale agricultural, horticultural and reforestation operations. For example, there has been a need to provide automated planting and growing of conifer and hardwood seedlings and outplanting of such seedlings in reforestation, to extend the planting season to feasible limits, as against the present one or two months of outplanting possible with bareroot planting, thus making more efficient use of labor and facilities. This is a major problem in that it is necessary to replant at least one billion trees a year at present to provide adequate reforestation in the United States of America alone. Similarly, containerization is held to be beneficial for other plants, for example, flowers, vegetables, grasses and the like, both in the United States and in other countries.

One approach, in an attempt to solve this problem, has been to provide a wide range of containers, for example: paper tubes, plastic tubes, plastic webbing, and plastic and paper tray molds filled with various potting mixtures for seed germination and plant growth. These have not always been satisfactory because, among other reasons, these containers confine the root system during the early stages, which often has an effect on future growth characteristics. Particularly, in the case of trees, the lack of lateral root growth during the confinement period results in a circular type of root growth of the seedling when planted in the ground, and hence minimum lateral support for the tree and, in time, girdling may cause premature death. Also, these types of container systems are relatively expensive and have a relatively high gross weight, both wet and dry. Moreover, some plastic tubes fail to split open as a result of root pressure and, in some soils and climatic conditions, while some paper tubes disintegrate rapidly, others remain intact months after planting. The plastic tray molds filled with soil are not suitable for automatic planting in that such an unconsolidated medium must depend entirely upon root proliferation for cohesion and this is rarely achieved.

Another approach to the problem is the self-contained medium such as compressed peat moss, various compressed and molded cubes and the like (BR-8, Kys Kube), but these do not always hold together well, may lack flexibility of design, are subject to waterlogging, and generally are insufficiently supplied with nutrients.

In the home consumer trade there is a need for a plant growth medium that can be used for a variety of growth purposes which releases nutrients slowly over growing periods. There is also need for such a plant growth medium which can be used in a variety of physical forms or ground and used by itself or in potting mixtures particularly in view of the problems in obtaining adequate supplies of peat and peat of desired and consistent specification.

The present invention is directed to an improved nutrient plant growth medium which advantageously has the cation exchange capacity of good natural soils, as well as the additional factors previously mentioned, by the use of relatively inexpensive components and without the necessity of separately making an expensive nitrated nutrient ion exchange resin and then incorporating it into the foamed matrix.

SUMMARY

The present invention relates to an improved selfcontained plant growth medium having a polyurethane matrix of at least 40% open cells and having nutrients in diverse forms available for use by plants, as in natural soils, together with additional anion retention sites and cell films which, in the latter case, at least partly envelop nutrient filler particles for meeting plant nutrient requirements thus fortifying the influence of the other nutrient supply sources available for use by plants as are common in natural soils. The plant growth medium is semirigid and still sufficiently pliable to lend itself to mechanical outplanting or may be flexible for use such as hanging baskets and pot fillers, has good moisture retention while insuring excellent air-water balance even when overwatered, can be formed into various shapes and sizes which easily lend themselves to a variety of uses, in which the nutrients are slowly released over growing periods, and in which the properties and characteristics can be varied to meet specific plant requirements as to nutrients, pH and the like.

Such a plant growth medium is provided according to the present invention by combining in a polyurethane matrix having at least 40% and preferably 50–55% open cells, from about 36% to 50% by weight and more (for example 60%, the upper limit being due to practical considerations) of a granular filler which includes from about 69% to about 78% by weight (based on the filler) clay having relatively high cation-exchange capacity, such as a calcium-hydrogen montmorillonite clay, and from about 22% to about 31% by weight (based on the filler) plant nutrients and their carriers which, coacting with the polyurethane matrix and clay, provide the unique nutrient retention and release mechanisms which result in a plant propagation and plant growth medium with properties and characteristics valuable for performance.

Accordingly, it is highly desirable, and it is an object of this invention, to provide a relatively inexpensive plant growth medium comprised of a polyurethane matrix having nutrients dispersed throughout in forms available for use by plants as in natural soils.

It would be highly advantageous, as it is an object of the present invention, to provide a plant growth medium comprised of a polyurethane matrix having nutrients dispersed throughout for use by plants as in natural soils, and additional anion retention sites integral with the matrix thereby providing special growth characteristics especially valuable for performance.

It would be advantageous, and it is an object of the present invention, to provide a plant growth medium comprised of a polyurethane matrix having dispersed throughout nutrients in forms available for use by plants as in natural soils, together with integrated anion retention sites and polyurethane cell films enveloping at least partly nutrient filler particles thus creating a semipermeable membrane which responds to osmotic pressures due to ionic and molecular concentration gradients in the external solution thereby providing an additional mechanism for meeting plant nutrient requirements and thus fortifying the influence of the mechanisms for providing nutrients occurring in natural soils.

A further object of the present invention is the provision of a plant growth medium having a polyurethane matrix with at least 40% open cells and having integral anion retention and release sites capable of taking on exchangeable anions of nitrate, phosphate and sulfate, having from about 36% to about 60% by weight of a filler dispersed throughout comprised of about 69% to 78% by weight (based on the filler) of a calcium-hydrogen montmorillonite clay having ion retention sites capable of taking on exchangeable cations of magnesium, potassium, iron and ammonium nitrogen by replacement of calcium and hydrogen ions, and from about 22% to about 31% by weight (based on the filler) of plant nutrients and their carriers comprised of salts and compounds at least partly encapsulated by cells of the polyurethane matrix capable of diffusion through membranes of the cells in response to osmotic pressure thereby providing mechanisms for meeting plant nutrient requirements.

A further object of the present invention is the provision of such a polyurethane plant growth medium having the foregoing ion exchange and diffusion characteristics and properties in which nitrogen is supplied in nitrate and ammonium forms; phosphorus, potassium, magnesium, iron, sulfate, chloride as soluble salts in the filler; and in which microfrit supplies manganese, zinc, boron, copper and molybdenum and the clay supplies calcium thereby providing all thirteen essential plant nutrients.

A further object of the present invention is the provision of such a polyurethane plant growth medium having the foregoing properties and characteristics, which can be semirigid and formed into various shapes and sizes which easily lend themselves to subsequent automation in outplanting or which may be flexible and formed into various sizes and shapes for various uses, such as pot plants, pot fillers and the like.

It would also be advantageous, and it is an object of the present invention, to provide a polyurethane plant growth medium having the foregoing properties and characteristics which has good water retention, in which the nutrients are slowly released over growing periods and which can be varied to meet specific plant requirements as to nutrients, pH and the like.

It would be highly desirable, and it is an object of the present invention, to provide an inexpensive filler for a polyurethane matrix which can be made simply by mixing available components and inserting the granular mixture into the liquid reactants just before foaming to provide inexpensively and easily a polyurethane plant growth medium having the foregoing desirable characteristics and properties.

A further object of the present invention is the provision of a polyurethane matrix which includes a relatively high percentage of a clay having a relatively high ion exchange capacity for the plant nutrients thus retaining the plant nutrients in forms available for use by plants, as occurs in natural soils.

A further object of the present invention is the provision of a plant growth medium comprised of a polyurethane matrix in which it is unnecessary to utilize a specially prepared synthetic ion exchange resin or resins to retain plant nutrients to prevent them from leaching out.

A further object of the present invention is the provision of such a plant growth medium which may be readily provided in a variety of physical forms for various uses, including in ground form by itself or combined with other soil materials, such as potting mixes, and which can be used in place of peat.

Other and further objects, advantages and features of the present invention will be apparent from the Abstract of the Disclosure, the Background of the Invention, this Summary and the following description of presently preferred embodiments of the invention, given for the purpose of disclosure, and the Claims.

DESCRIPTION OF THE PREFERRED EMBODIMENTS

The plant growth medium includes a polyurethane matrix having incorporated therein and dispersed throughout a finely divided (30–100 mesh) granular filler in an amount of from about 36% to about 50%, and preferably about 46% by weight, although more filler may be so dispersed, for example 60% by weight, based on practical considerations. The nutrient filler is comprised of from about 69% to about 78%, and preferably about 75%, by weight (based on the filler), clay having relatively high cation-exchange capacity, such as a calcium-hydrogen montmorillonite clay, and from about 22% to about 31%, and preferably about 25% by weight (based on the filler) plant nutrients, including their carriers.

Of the clay materials, a calcium-hydrogen montmorillonite is preferred because of its availability and predictability of behavior. The term "montmorillonite" is used in its normal meaning to designate a group name for clay minerals with a three platelet expanding lattice except for vermiculite (not to be confused with the misnomer applied to exfoliated biotite mica) and other clays interstratified with chlorite but also as a specific mineral name. Specifically, it indicates a high-alumina end member of the montmorillonite group. The montmorillonites have high cation exchange capacity. For example, at page 129 in *Clay Minerology* by Ralph E. Grim, McGraw-Hill Book Company, Inc. 1953 (McGraw-Hill Series in the Geological Sciences), the cation exchange capacity of clay minerals, in milliequivalents per 100 G., is set forth and montmorillonite has a cation exchange capacity of 80–150. In such clays, only a small part of the charge is pH dependent while most of the negativity is due to isomorphous substitution of ions in the crystal lattice.

Preferably, for automated and other outplanting, the polyurethane matrix should be neither flexible nor rigid, but should be semi-rigid, and dimensionally stable, wet or dry. For other uses, such as hanging baskets, pot fillers and the like, the polyurethane matrix can be more flexible, if desired. The final properties of the urethane matrix depend principally on the choice of the polyol and isocyanate. Due to use of filler and desired characteristics, a long chain polyhydroxyl compound is reacted with a polyisocyanate to form a relatively high molecular weight polymer which is then foamed by a suitable foaming system, usually by reaction of water or other hydrogen donors with the free isocyanate content of the polymer, resulting in the formation of carbon dioxide which expands the polymer into the desired cellular plastic matrix. The degree of branching in the formulation permits an extremely wide range of properties in the final foam plastic matrix. To obtain residual tertiary amine and rigidity, a low equivalent weight triol is included. The density of the foam is controlled to a great extent by the choice of ingredients, amount of filler, and amount of water employed. The configuration of the cell depends principally on the combined natures and equivalent weights of the long chain polyhydroxyl and the triol reactants. Lower equivalent weight polyhydroxyl materials favor the production of a closed cell structure and the higher equivalent weight polyhydroxyl materials lead to the open cell structure. The degree of branching of the polyhydroxyl and amine reactants also influences the cell character. Thus, the final properties depend on the choice of polyol or polyols.

A variety of isocyanates can be employed in producing the polyurethane matrix of the invention, although a polyfunctional isocyanate having low viscosity, low functionality and high diphenylmethane diisocyanate content allows a range of rigidity, flexibility, elastomeric and resiliency qualities to be made.

While there is flexibility in formulating the polyurethane matrix, i. e., polyols having a molecular weight ranging from about 500 to about 3,000 can be used as sources of active hydrogen, it is desirable to use a low hydroxyl number (28–43) polyol having a high proportion of ethylene oxide in the ethylene:propylene ratio (50–70%). Such a polyol allows adequate liquid to envelop dry filler and has a hydrophillic nature. It is necessary, and a prime point of the present invention to include low equivalent weight, high hydroxyl triol containing tertiary amine groups. The ratio of these two polyols can be varied to some degree and the nature of the resulting product is directly affected.

It is the usual practice to employ an amine and a tin catalyst. In addition, a cell opener has been found desirable. Finely divided carbon black is included to enhance cell opening, reduce shrinking, and provide a final growing medium that is aesthetically desirable to growers.

The control of cell size and the percentage of open cells are important as these factors affect the capillarity and moisture control characteristics and the amount of shrinkage of the matrix. Cell size also has a bearing on root penetration and water retention characteristics of the foam. The matrix densities, including filler, range from about 2.0 lb. to about 3.5 lb. per cubic foot. A desired density is about 3.0 lb. per cubic foot with about 50% open cells, but for adequate root growth and penetration, there should not be less than about 40% open cells. Preferably, for a semi-rigid matrix, there should be about 45% to about 55% open cells.

It is important in a plant growth matrix to provide a nutrient regime that permits specific activities of important ions to correlate with the needs of most normal plant genera. An important aspect of this revolves around having a buffered medium to resist abrupt changes in acidity and alkalinity while maintaining the best pH range for nutrient availability. In the present invention, the cation exchange is accomplished through use of a calcium-hydrogen montmorillonite clay preferably having an original pH range of from about 7.7 to about 7.9. Preferably, the plant nutrients magnesium, potassium, ammonium nitrogen, and ferrous iron are incorporated in the nutrient filler in amounts to provide a degree of calcium and proton replacement which will allow cation ratios of these important nutrients to be closely maintained for optimum physiological utilization. Preferably, anion sites of the polyurethane matrix are saturated with nitrate, phosphate and sulfate by careful adjustment of the soluble salt concentrations carrying these major nutrient sources. Preferably, the minor elements, iron, manganese, zinc, copper, boron and molybdenum are supplied as relatively insoluble silicates in amounts satisfactory for plant utilization. Preferably, reduced urea nitrogen is supplied in pulverized and in normal size urea formaldehyde pellets for enzymatic release and conversion to available nitrogen forms over a period of time. A chelated form of iron is included to supplement the soluble and relatively insoluble sources used. The final product has a pH of 6.3 to 6.8. For certain plants, conifer trees in particular, the final pH is lowered to 5.8 to 6.2 by a surface spray of 0.01 N $HNO_3$. In some instances, a nonionic surfactant is sprayed on the product surface being found helpful in initial wetting and most useful to amateur growers. Further, some results have shown that additions of certain natural organic plant extracts when sprayed on the product surface may have beneficial effects on enzymatic actions.

The complete mixture of clay and nutrient sources is mixed thoroughly and incorporated into the polyurethane reaction components immediately prior to foaming. With proper metering and mixing machinery, there is considerable latitude for loading of the nutrient filler to provide a wide range for various plant nutritional purposes. The desired range is from about 36% to 50% by weight of the product, although larger amounts of the filler, for example, up to 55–60% by weight, depending on practical considerations, may be used.

The choice of the polyurethane formula directly influences the nutrient content and therefore becomes an integral part of the product. For example, a semi-rigid polyurethane matrix according to the invention produced for seedling and cutting propagation may have a different nutrient status from the more flexible polyurethane matrix produced for long-time plant growth, for example, hanging baskets, pot fillers and the like. It is highly desirable to have flexibility in nutrient status for different types of matrices and different uses.

The following Table I sets forth a preferred nutrient filler composition according to the invention in which the range and components are in percentages by weight.

TABLE I.

Nutrient Filler for Polyurethane Foam Matrix

| Ingredient | %Composition Range | %Composition Preferred |
|---|---|---|
| Diammonium phosphate | 3–4 | 4.00 |
| Potassium nitrate | 3–4 | 4.00 |
| Gypsum | 1–2 | 1.00 |
| Potassium-magnesium sulfate | 1–2 | 2.00 |
| Potassium meta phosphate | 1–2 | 1.00 |
| Microfrit 504 (minor elements) | 3–4 | 3.00 |
| Iron chelate | 0.25–0.40 | 0.30 |
| Ferrous sulfate | 0.25–0.40 | 0.30 |
| Granular urea formaldehyde | 6–8 | 6.00 |
| Pulverized ureaformaldehyde | 4–5 | 4.00 |
| Montmorillonitic clay | 69–78 | 75.00 |

The nutrient filler set forth in the foregoing Table I includes all nutrients necessary and desirable for growth of most plants, including monocotyledons, dicotyledons, and other members of the plant kingdom. Such a filler when incorporated in a polyurethane matrix according to the invention has the six nutrient mechanism factors previously set forth, thus providing a self-contained plant growth medium especially valuable for performance. Other compounds can be substituted for those in Table I as long as the nutrient composition and ionic activity accomplish the same result.

The following examples illustrate embodiments of polyurethane plant growth media according to the present invention in which all percentages are by weight. For convenience, the examples include commercially-available products and the companies from which they may be obtained, which are specific commercial products of the various components previously described.

EXAMPLE I

In this example, the nutrient polyurethane matrix contains the following components:

TABLE II.

Examples of Product Formulation No. HB-2

| Components | %By Weight |
|---|---|
| (B) S-1421 Polyol (DOW) | 17.00 |
| (B) R-350-x Polyol (JEFFERSON) | 7.50 |
| (B) Sunpar (SUN OIL CO.) | .70 |
| (B) Carbon Black (SRF) | .90 |
| (B) T-12 (M&T) | .02 |
| (B) Water (Deionized) | .88 |
| (A) PAPI 901 (UPJOHN) | 27.00 |
| (C) Nutrient Filler (Preferred) (Table I) | 46.00 |

The ingredients designated by the letter "B" were mixed in the order listed. The mixed components designated by the letter "B" and component "A" were then mixed in a typical foam machine, such as manufactured by Martin Sweets Company, and directed through a secondary mixer to which was simultaneously fed the nutrient filler component, preferably by means of a Vibracrew metering device. The foam was then poured into molds and also run as a continuous stream. In either case, the material moved on a conveyor through a small oven maintained at a temperature from about 90° to about 110°C. for a period of about 2 minutes to about 3 minutes to finally cure the foamed matrix which was then ready for removal from the mold or conveyor in about 8 minutes. The foamed matrix was then crushed by a hydraulic press to open cells and prevent shrinking. Approximately 20 to 40 psi pressure was used to crush the matrix to about half or slightly less than half its volume to rupture cells. After 24 hours, the matrix was cut into various shapes and sizes, and holes were cut into it as desired for specific uses for plant propagation.

This plant growth medium was semi-rigid, had good water retention properties, maintained a substantially constant size wet and dry, and had the six plant nutrient retention factors mentioned which made it highly desirable for plant growth.

EXAMPLE II.

In this example, the following components were mixed together:

TABLE III.

No. BJ-1

| Components | % By Weight |
|---|---|
| (B) 4413-3 Polyol (JEFFERSON) | 27.50 |
| (B) R-350-x Polyol (JEFFERSON) | 8.00 |
| (B) Thancat TAP (JEFFERSON) | .40 |
| (B) Water (Deionized) | .50 |
| (A) MRS Isocyanate (MOBAY) | 26.80 |
| (C) Nutrient Filler (Preferred Table I) | 36.80 |

The components designated by the letter "B" were premixed in the order listed in Table III and then combined with the isocyanate designated by the letter "A" in a foam machine. These combined components were then thoroughly mixed with the preferred nutrient filler from Table I, Item C, in a secondary mixer, the nutrient filler being metered directly into the secondary mixer, such as by a Vibrascrew machine. The foam was then poured into molds and as molds and as a continuous stream conveyed through a small oven at a temperature from 90° to 110°C. for a period of 2 minutes to 3 minutes for final curing. To prevent shrinkage, the matrix was then crushed by a hydraulic press 3 minutes after the matrix set as in Example I. After 24 hours, the matrix was cut into various sizes and shapes for plant propagration purposes. This plant growth medium also had good water retention, remained at substantially the same volume wet and dry, and had the six plant nutrient retention factors mentioned resulting in a valuable nutrient plant growth medium.

EXAMPLE III.

In this example, the polyurethane matrix had the components set forth in the following table:

TABLE IV.

No. 1-BA-19

| Components | % By Weight |
|---|---|
| (A) 390-P Isocyanate (UPJOHN) | 24.00 |
| (A) S-1421 Polyol (DOW) | 4.00 |
| (B) S-1421 Polyol (DOW) | 18.00 |
| (B) R-350-x Polyol (JEFFERSON) | 2.00 |
| (B) Polycat 22 (ABBOTT) | 0.07 |
| (B) Sunpar (SUN OIL CO.) | 0.45 |
| (B) Carbon Black SRF | 1.50 |
| (C) Nutrient Filler | 50.00 |

The "A" components were mixed and allowed to react over a 24-hour period. The "B" components were mixed in the order set forth, then combined with the "A" components and then these combined components were mixed in a secondary mixer with the preferred nutrient filler of Table I, C component, and passed through an oven for curing. In this example, however, the addition of the above amount of carbon black provided a nutrient polyurethane matrix which contained sufficient open cells to prevent shrinking and no crushing of the product was necessary.

EXAMPLE IV.

In this example, the filler composition was as set forth in the following table:

TABLE V.

| Filler Composition | Batch Size | Approximate% |
|---|---|---|
| Di Ammonium Phosphate | 3 lb. 3 oz. | 2 |
| Potassium Nitrate | 3 lb. 12 oz. | 3 |
| Ground Urea | 1 lb. 13 oz. | 1 |
| Potassium-Magnesium Sulfate | 2 lb. 8 oz. | 2 |
| Microfrit 504 | 4 lb. | 3 |
| Potassium Metaphosphate | 4 lb. | 3 |
| Iron Chelate (Geigy 308) | 6 oz. | ½ |
| Ferrous Sulfate | 6 oz. | ½ |
| Pulverized Ureaformaldehyde | 5 lb. | 4 |
| Granular Ureaformaldehyde | 10 lb. | 8 |
| Montmorillonite Clay (G-45) | 96 lb. | 73 |
| TOTAL: | 132 lb. | 100 |

In making this plant growth medium, the following components were utilized as set forth in the following table:

TABLE VI.

No. 1-B-1

| | | | B Foam Composition | |
|---|---|---|---|---|
| (A) | 390-P (polyisocyanate) | 31% | No. 1421 Polyol | 87% |
| (B) | Polyol mix (see on right) | 29% | R-350-x | 6% |
| Filler | | 40% | Polycat No. 22 (amine) | ⅔% |
| | TOTAL: | 100% | Water | ⅓% |
| | | | Sunpar | 2% |
| | | | Carbon Black SRF | 4% |
| | | | TOTAL: | 100% |

The components were mixed as previously described and passed through an oven for curing as in the previous examples. It was necessary, however, to crush this matrix to open the cells and prevent shrinkage.

The plant growth medium also had good water retention properties, had substantially constant volume both wet and dry, and had the six plant nutrient retention factors mentioned resulting in a valuable plant growth medium.

EXAMPLE V.

In this example, the filler composition was as set forth in the following table:

TABLE VII.

| Filler Formula | Per Batch Lb. | Approximate % |
|---|---|---|
| Diammonium phosphate | 4 | 3.20 |
| Potassium nitrate | 4 | 3.20 |
| Gypsum | 2 | 1.60 |
| Triple superphosphate | 1½ | 1.20 |
| Potassium-magnesium sulfate | 2 | 1.60 |
| Microfrit 504 | 4 | 3.20 |
| Fe 330 | 6 oz. | .35 |
| FeSO₄ 7H₂O (Ferrous sulfate) | 6 oz. | .35 |
| Ureaformaldehyde - pulverized | 5 | 4.00 |
| Ureaformaldehyde - regular prills | 8 | 6.30 |
| G-45 Montmorillinite clay | 96 | 75.00 |
| TOTAL: | 128¼ | 100.00 |

In making these two polyurethane matrices, the components were used as set forth in the following table:

TABLE VIII.

| | | 232-B % by Weight | 232-M9 % by Weight |
|---|---|---|---|
| (A) | PAPI 901 | 24.00 | 22.00 |
| (B) | 1421 | 21.00 | 16.00 |
| (B) | 350-x | 2.40 | 8.00 |
| (B) | Carbon Black 3009L | 1.60 | 3.30 |
| (B) | Sunpar | 0.52 | 0.47 |
| (B) | Polycat 22 | .27 | .21 |
| (B) | Water | .18 | — |
| (B) | UL-1 | .03 | .02 |
| (C) | Filler | 50.00 | 50.00 |
| | TOTAL: | 100.00 | 100.00 |

The components were mixed, foamed and cured as in the previous examples. It was unnecessary to crush these matrices to open cells and prevent shrinkage.

These plant growth media had good water retention, had substantially constant volume, both wet and dry, were semi-rigid, had the six plant nutrient retention factors mentioned, good water characteristics and proved valuable for plant performance.

EXAMPLE VI.

To demonstrate that the products produced from this invention can truly meet the physiological needs of a plant from seed to seed, tomato (*Lycopersicon esculentum*) and cantaloupe (*Cucumis melo*) were seeded in small (¾ × ¾ × 2 inches) blocks of the product of Example II. Following root emergence, these small blocks were inserted in larger blocks of the product and the plants grown to maturity. Similar techniques have been used successfully with petunias and marigolds. Further, many thousands of loblolly pine seedlings have been propagated from seed in ¾ × ¾ × 4 inches blocks of the product and several hundred of these have been successfully outplanted in various soil regions of the South. Further, numerous genera and species have been propagated vegetatively in the product. These include pittosporum, euonymous, oleander, japanese yew and many more.

The plant growth medium may be used in a variety of different physical forms as the medium can be cut into desired forms and may be ground up and used in ground form alone or with other soil materials, such as potting mixes. Advantageously, the ground plant growth medium can be used in soil and potting mixes instead of or with peat, which is in short supply and which does not meet a constant specification such as the ground plant growth medium of the present invention. In addition, the plant growth medium of this invention is a consistent product and provides slow release of nutrients.

Polyurethane plant growth media according to the present invention include the six nutrient retention and release mechanisms with particular polyurethane foam ingredients including integrated anion retention sites, cation retention sites and at least part encapsulation of the nutrient filler particles by the matrix cell membrane which results in plant propagation and plant growth media having characteristics especially valuable for performance.

Accordingly, the present invention is well suited and adapted to attain the objects and ends and has the advantages and features mentioned.

While presently-preferred embodiments of the invention have been given for the purpose of disclosure, changes may be made which are within the spirit of the invention as defined by the scope of the appended claims.

What is claimed is:

1. A plant growth medium consisting essentially of
   a polyurethane matrix having at least 40% open cells and having integral tertiary amine groups, the inductive effect of which provides anion retention and release sites capable of taking on exchangeable ions of nitrate, phosphate, and sulfate,
   a filler in an amount of from about 36% to about 60% by weight based on the total weight of the plant growth medium dispersed throughout the polyurethane matrix,
   the filler comprised of about 69% to about 78% by weight based on the filler of a calcium-hydrogen montmorillonite clay having cation retention and relase sites capable of taking on exchangeable cations of magnesium, potassium, iron and ammonium nitrogen by replacement of calcium and hydrogen ions, and
   from about 22% to about 31% by weight based on the filler of plant nutrients and their carriers comprised of salts and compounds at least partly encapsulated by cells of the polyurethane matrix capable of diffusion through membranes of the cells in response to osmotic pressure,
   the cations of the nutrients being exchangeably retained on the cation retention sites and the anions of the nutrients being exchangeably retained on the anion retention sites.

2. The plant growth medium of claim 1 where,
   the polyurethane matrix has between about 50% to about 55% open cells.

3. The plant growth medium of claim 1 where,
   the matrix is further characterized by having a substantially constant volume, both wet and dry.

4. The plant growth medium of claim 1 where,
   the plant nutrients and their carrier comprise nitrogen as nitrate and ammonium in pulverized and pellet form,
   phosphorus, potassium, magnesium, iron, sulfur and chloride as soluble salts, and where
   micro-frit supplies manganese, zinc, boron, copper and molybdenum, and
   calcium is supplied by the clay,
   whereby essential plant nutrients are supplied by the plant growth medium.

* * * * *